(12) United States Patent
Merugu et al.

(10) Patent No.: US 7,061,874 B2
(45) Date of Patent: Jun. 13, 2006

(54) METHOD, SYSTEM AND COMPUTER PROGRAM PRODUCT FOR CLASSIFYING PACKET FLOWS WITH A BIT MASK

(75) Inventors: Shashidhar Merugu, Atlanta, GA (US); Ajay Chandra V Gummalla, Atlanta, GA (US); Dolors Sala, Atlanta, GA (US)

(73) Assignee: Broadcom Corporation, Irvine, CA (US)

( * ) Notice: Subject to any disclaimer, the term of this patent is extended or adjusted under 35 U.S.C. 154(b) by 479 days.

(21) Appl. No.: 10/050,762

(22) Filed: Jan. 18, 2002

(65) Prior Publication Data

US 2002/0152209 A1    Oct. 17, 2002

Related U.S. Application Data

(60) Provisional application No. 60/264,065, filed on Jan. 26, 2001.

(51) Int. Cl.
G06F 17/30    (2006.01)

(52) U.S. Cl. .................... 370/255; 370/389; 370/392; 707/7

(58) Field of Classification Search ............... 370/225, 370/389, 395.31, 395.43, 392, 412, 255; 709/240, 230, 238, 228
See application file for complete search history.

(56) References Cited

U.S. PATENT DOCUMENTS

| 5,598,410 A | 1/1997 | Stone ...................... 370/469 |
| 5,938,736 A | 8/1999 | Muller et al. ............... 709/245 |
| 6,567,408 B1* | 5/2003 | Li et al. ................... 370/395.31 |
| 6,600,744 B1* | 7/2003 | Carr et al. ................... 370/392 |
| 2002/0089937 A1* | 7/2002 | Venkatachary et al. ..... 370/255 |

FOREIGN PATENT DOCUMENTS

EP    0 594 196 A1    4/1994

OTHER PUBLICATIONS

U.S. Appl. No. 60/249,701, Venkatachary et al., filed Nov. 16, 2000.*
Woo, T., "A Modular Approach to Packet Classification: Algorithms and Results," IEEE INFOCOM, IEEE, Mar. 2000, 10 pages.
Boyd, J., "Using CAM in Today's High-Speed Networks," [retrieved Aug. 15, 2002] at http://www.eedesign.com/design/cam/cam.html, 11 pages.
Buddhikot, M. et al, "Space Decomposition Techniques for Fast Layer-4 Switching," *Proceedings of Protocols for High Speed Networks*, Salem, Massachusetts, Aug. 1999, 19 pages.

(Continued)

*Primary Examiner*—Charles Rones
*Assistant Examiner*—Belix M. Ortiz
(74) *Attorney, Agent, or Firm*—Sterne, Kessler, Goldstein & Fox PLLC

(57) ABSTRACT

Classification of packets into flows is an inherent operation performed by networks that support enhanced services. To support multiple-dimensional packet classification, a packet classification system is provided to select representative bits from a packet to look up a set of rules. The per-flow classification works with a large set of rules, where each rule comprises of multiple fields and also allows fast dynamic variation in the rule set. A lookup process includes a simple and finite set of instructions that can be efficiently implemented as pipelined hardware and support very high packet arrival rates.

35 Claims, 8 Drawing Sheets

Packet Classification System

OTHER PUBLICATIONS

Charikar, M. et al, "Combinatorial feature selection problems," *Proceedings of 41st Annual Symposium on Foundations of Computer Science*, IEEE, Nov. 12-14, 2000, pp. 631-640.

Dash, M. and Liu, H., "Feature Selection of Classification," *Intelligent Data Analysis*, Elsevier Science B.V., 1997, pp. 131-156.

Degermark, M. et al, "Small Forwarding Tables for Fast Routing Lookups," Computer Communication Review, ACM, vol. 27, No. 4, Oct. 1997, pp. 3-14.

Feldmann, A. and Muthukrishnan, S., "Tradeoffs for Packet Classification," *Proceedings IEEE INFOCOM 2000*, IEEE, Mar. 26-30, 2000, vol. 3, pp. 1193-1202.

Gupta, P. and McKewon, N., "Packet Classification using Hierarchical Intelligent Cuttings," *Hot Interconnects VII*, Aug. 1999, 9 pages.

Gupta, P. McLeown, N., "Algorithms for Packet Classification," *IEEE Network Magazine*, IEEE, Mar./Apr. 2001, pp. 24-32.

Gupta, P. and McKeown, N., "Packet Classification on Multiple Fields," *ACM SIGCOMM*, ACM, Sep. 1999, 14 pages.

Koller, D. and Sahami, M., "Toward Optimal Feature Selection," *Machine Learning—Proceedings of the Thirteenth International Conference (ICML '96)*, Morgan Kaufmann Publishers, Jul. 3-6, 1996, pp. 284-292.

Lakshman, T.V. and Stiliadis, D., "High-Speed Policy-based Packet Forwarding Using Efficient Multi-dimensional Range Matching," ACM SIGCOMM, ACM, Sep. 1998, pp. 203-214.

Ruiz-Sánchez, M.Á. et al., "Survey and Taxonomy of IP Address Lookup Algorithms," *IEEE Network Magazine*, IEEE, vol. 15, No. 2, Mar./APr. 2001, pp. 8-23.

Srinivasan, V. et al., "Packet Classification using Tuple Space Search," *ACM SIGCOMM*, ACM, Sep. 1999, pp. 135-146.

Srinivasan, V.et al., "Fast and Scalable Layer Four Switching," *ACM SIGCOMM*, ACM, Sep. 1998, pp. 191-202.

Tsuchiya, P.F., "A Search Algorithm for Table Entries with Non-contiguous Wildcarding," Bellcore, 1991, 10 pages [online], [retrieved Sep. 6, 2002]. Retrieved from the Internet: <URL: http://marcel.wanda.ch/Archive/Cecilia.pdf>.

Waldgovel, M. et al., "Scalable High Speed IP Routing Lookups," *Computer Communication Review*, ACM, vol. 27, No. 4, Oct. 1997, pp. 25-36.

Copy of Search Report for European Application No. 02250549.9, issued on Jul. 3, 2003.

* cited by examiner

METHOD, SYSTEM AND COMPUTER PROGRAM PRODUCT FOR CLASSIFYING PACKET FLOWS WITH A BIT MASK

CROSS-REFERENCE TO RELATED APPLICATIONS

This application claims the benefit of U.S. Provisional Application Ser. No. 60/264,065, filed Jan. 26, 2001, by Merugu et al., entitled "Method, System and Computer Program Product for Classifying Packet Flows with a Bit Mask," incorporated herein by reference.

BACKGROUND OF THE INVENTION

1. Field of the Invention

The present invention is directed to controlling network transmissions. More particularly, the present invention relates to classifying data packets in an internetworking environment.

2. Related Art

As network infrastructure is being geared to support newly enhanced services, an evolution in the mechanisms that are used to handle traffic in networks can be observed. Packet switching introduces the task of routing a packet (i.e., IP datagram or protocol data unit (PDU)) based on its destination address. This task was simple in the past, not only because of the low volume of traffic, but also because there was only a need to examine only one dimension (i.e., field) in a packet header. As networks continue to evolve, the task of packet routing will became even more complex with the need for policy-based routing, access-control in networks, traffic accounting and billing, support for quality of service, per-flow computation in active networks, and the like.

All the mechanisms that achieve packet routing today can be categorized broadly into a problem domain called "classification of packets." The key idea in packet classification is to find a best fit among a set of rules, where each rule describes a class of packets. A subsequent operation is to perform the action associated with the best-fit rule. However, as suggested, several factors render conventional packet classification techniques ineffective. For instance, as the set of rules increases in size, more memory space is required to search and identify the appropriate rule that matches an incoming packet. Additionally, the dimensions of search space for identifying a rule are directly proportional to the number of fields supported in a rule.

Another challenge to efficient packet classification involves the hierarchy of protocol headers. If the data traffic includes multiple patterns of protocol headers (e.g. [Ethernet+IP+TCP], [Ethernet+IP+UDP], and [Ethernet+ARP]), it is imperative to identify the correct pattern of protocol headers before applying the rule-matching function.

Conventional packet classification methodologies are also impaired by frequent rule changes. In other words, the rule set typically changes or is updated during due course. Dynamically varying rule sets grant a packet classifier with very little time to examine or optimize the rule set database. A rule-set database is usually pre-processed and stored in optimal data structures for fast access. The pre-processing stage has a trade-off between time and memory consumption. Good optimizations can result from highly compressing the rule-set, but take a long time. Moreover, the faster the packet arrivals, the shorter the time the packet classifier has to classify a single packet.

An example of a multiple-field packet classification is a firewall. Firewalls usually have a small set of rules based on the policy of an organization. Firewall rules are quite general in terms of the number of kinds of packets it describes. The more general a rule, the larger the number of packets that match it. For example, a more general rule would have fewer fields per rule, and more wildcards or ranges for its fields. On the other hand, a more specific rule could have large number fields with each field represented by a singleton value. The generality of a rule has an implicit inverse relation with the cardinality and variation of the rule set.

Nonetheless, unlike firewalls, a flow-classifier table has a large set of rules with each rule spanning over many fields. A flow-classifier rule table is updated whenever a new flow is instantiated or an old flow is discarded. The frequency of flow creation or deletion is orders of magnitude higher than the rate of variation of a firewall table (i.e., firewall tables are updated when policies are revised).

Consequently, a system and method are needed to solve the above-identified problems and provide a simple, efficient and cost-effective way to classify packets in a dynamic environment.

SUMMARY OF THE INVENTION

The present invention provides a system and method for packet classification that is based on the use of a hash function that extracts bits using a mask. A relatively small set of bits is selected to uniquely identify the packets satisfying a packet classification rule.

In an embodiment, the mask is constructed by evaluating each field description or location in a rule set in multiple iterations. In each iteration, an optimal location is determined based on a metric that measures the partition of the rule set into subsets. The number of locations selected for the mask is based on the original size of the rule set and collision control parameters.

The mask is used to refine the rule set to a form that is easily accessible later for packet classification. An automated learning process is implemented to build and update the original rule set and/or refined rule set, based on incoming packets. Changes to the rule sets are handled on-line via a fast update mode that adds to the refined rule table, while a background process performs re-optimization of the original or full rule table less frequently.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the leftmost digit(s) of a reference number identifies the drawing in which the reference number first appears.

DETAILED DESCRIPTION OF THE INVENTION

Generally, objects are described by their features. Applications that have to learn about a large data set of objects tend to pick those features that are relevant and discard those that are redundant. Many such applications can be found in literature, especially in databases, and artificial intelligence. This approach of reducing the dimensionality of search space by removing irrelevant features is called "Feature Selection," as discussed by M. Dash and H. Liu in "Feature Selection Methods for Classification: A survey," Technical Report, Department of Information Systems and Computer Science, National Institute of Singapore, (1999).

Feature selection can be used to learn about huge data sets, especially to classify objects based on prominent features. The method and system of the present invention apply feature selection to the context of packet classification. Since packet classification involves rules that describe packet headers, a feature for packet classification can be a "field", as in a protocol header, or a "chunk of bits", independent of protocol header structure. If using chunk of bits, a subset of bit locations must be selected such that the bits extracted from these locations represent the entire data set.

In an embodiment of the present invention, a data set comprises of M bit vectors each of size k bits. A subset l out of k bit locations $\{b_1, b_2, \ldots, b_k\}$ are selected such that the bits in these l locations for all M bit vectors best represent the entire data set. Subsequent changes to the data set can be easily accommodated by adding or deleting the representative bits in subset l locations. In an embodiment, the subset is built by using a hash function H, that can be represented as an l-tuple $(p_1, p_2, \ldots, p_l)$, where $p_i$ denotes a bit location.

The selection of the bit locations depends on the original data set of M bit vectors. Moreover, the process of reducing the bit vectors from size k to size l can be expressed as a projection of M points in k dimensional space onto smaller l dimensional space. It is important to note that this process of vector projection can project multiple points in k dimensional space to a single point in l dimensional space. Such projection of multiple points in higher dimensions to a single point in lower dimension is referred to as being a collision. Accordingly, the methods of the present invention seek to minimize collisions, ideally to none, by selecting the right set of l bits. Thus, the packet classification system and method of the present invention reduce k dimensions to just l dimensions.

Figure 1:
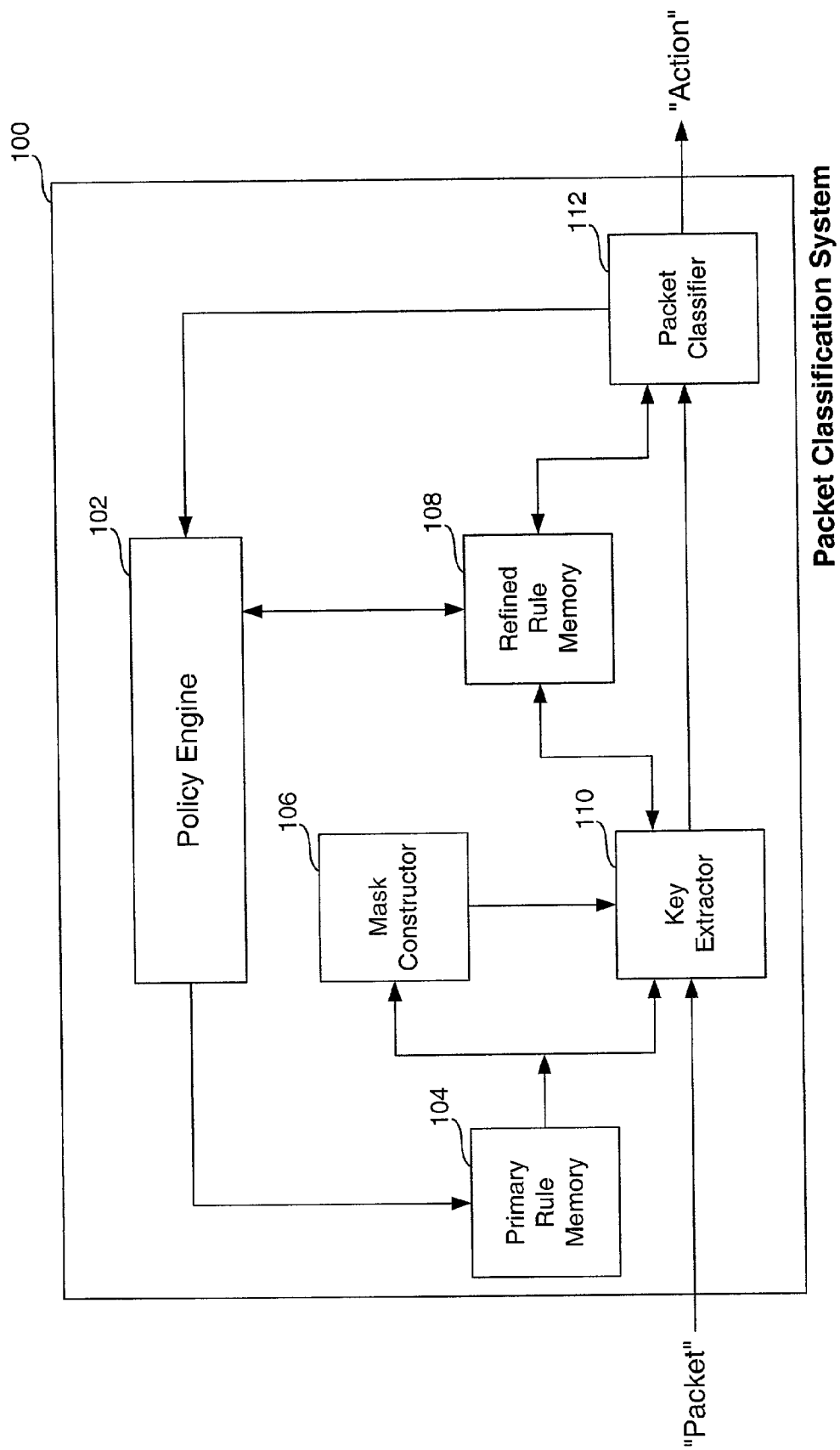
FIG. 1 illustrates a packet classification system according to an embodiment of the present invention.

FIG. 1 illustrates packet classification system 100 according to an embodiment of the present invention. System 100 includes a policy engine 102, primary rule memory 104, mask constructor 106, refined rule memory 108, key extractor 110, and packet classifier 112. Policy engine 102 stores the appropriate network rules and policies for classifying packets. Periodically, policy engine 102 sends updated lists of the rules to primary rule memory 104 and refined rule memory 108. In an embodiment, the updating occurs offline. In another embodiment, the rules are dynamically updated in real time or near term.

Mask constructor 106 receives or queries primary rule memory 104 for relevant rules and generates an extraction function. In an embodiment the extraction function is a hash function, in particularly a bit mask. The extraction function is sent to key extractor 110 that uses the extraction function (e.g., bit mask) to partition, index and/or categorize the rules located in primary rule memory 104. The rules, after being processed by key extractor 110, are stored in refined rule memory 108 for subsequent queries related to the operation of packet classifier 112.

Key extractor 110 also receives packets from across a network connection, which includes wired or wireless local area networks (LAN) or wide area networks (WAN), such as an organization's intranet, the global-based Internet (including the World Wide Web (WWW), or the like. Key extractor 110 applies the extraction function to create a packet key that is sent to the packet classifier 112. Packet classifier 112 uses the packet key to identify a rule that matches the incoming packet.

Thus, packet classification system 100 handles the creation and maintenance of primary rule memory 104 and refined rule memory 108, and the construction of the extraction function used by key extractor 110 to form a packet key from an incoming packet. In other words, primary rule memory 104 and refined rule memory 108 contain a set of classification rules, and an extraction function is produced by mask constructor 106 to refine the rules in primary rule memory 104 to a form that is easily accessible later for packet classification. The refined rules are stored in refined rule memory 108.

Although the extraction function can be designed to produce accurate results from a fixed or stochastic data set, it can be challenging to design an extraction function that fits a dynamically changing data set to produce accurate results all the time. Since the rule set typically varies dynamically, mask constructor 106 generates, in an embodiment, a flexible hash function. In other words, the present invention uses a hash function whose operational parameters can be dynamically tuned in response to changes in the rule set.

Although in an embodiment, the hash function created by mask constructor 106 is based on a bit mask, other extraction functions that meet the flexibility criteria can be used. The primary objective is to select, from a rule set, the best subset of l bit locations out of k possible locations. The goodness of fit for a subset can be measured in terms of the quantity of unique rules identified by examining the l bits. In other words, the extraction function is an optimization model that seeks to minimize the number of collisions when the dimensions are reduced.

System 100 includes a three-phase integrated control process to refine a rule set. First, policy engine 102 updates primary rule memory 104 with the pending request queue operations. In an embodiment, a request queue (not shown) is used to store all add and delete operations on primary rule memory 104 or refined rule memory 108. Secondly, mask constructor builds a hash function that best fits the rule set within primary rule memory 104. Finally, key extractor 110 runs the extraction function through all rules within primary rule memory 102 to create a refined rule set that is stored in refined rule memory 108.

In an embodiment, a simple heuristic model is used to create the extraction function. Heuristic-based extraction functions can be classified into two types: those that make use of class information about the data and those that do not use class information.

As an example of heuristic model that utilizes class information or empirical knowledge, mask constructor 106 constructs an extraction function that takes into consideration that the bits for an Ethernet_Protocol field are rarely different from that of a value for ETHERNET_PROTO_IP, and on the other hand, the bits corresponding to the fourth byte of an IP address vary substantially. So, the extraction function would select the more highly variable bits as the likely candidates that can uniquely identify a rule.

Mask constructor 106 can also construct an extraction function that does not make use of any class information. For example, the extraction function could count the number of 1's and 0's in each bit location across all rules and select those locations where these numbers are close to M/2, where M is the number of rules.

In another embodiment, an analytical model is used as the extraction function to compute metrics at different stages. This group of extraction functions can be divided into three types. The first type considers each bit location in isolation and ranks the bit locations according a specified metric. The extraction function would remove the bit location/dimension and examine the quality of the data that is left behind. For example, the quality of data can be interpreted as information entropy. The higher the quality, the more irrelevant the bit location is considered to be and the lower the bit location would be ranked. After ranking the bit locations in descending order, the extraction function would choose 1 best locations as the output subset.

A second type of analytical-based extraction functions is one that lists all the possible subsets of bit locations exhaustively and measures a metric for each listed item.

The third analytical-based extraction function is a hybrid of the first two types. At every stage of implementation, the extraction function maintains a current chosen subset of j (j<1) bit locations and tries to pick the best one from the rest to increment the subset. As an invariant, the extraction function ensures that the currently chosen subset of j locations is the best subset at present. Otherwise, the extraction function backtracks to the previous (smaller) subset. The extraction function recomputes the rank of the rest of the bit locations at every stage. This process repeats until the size of the chosen subset has increased to l bit locations. In other words, the extraction model uses a greedy algorithm to locally optimize at every stage. Although this extraction function is more complex than the extraction function that simply selects bits-in-isolation (i.e., the first type), it has more intelligence and is highly likely to result in the optimal solution.

Figure 2:
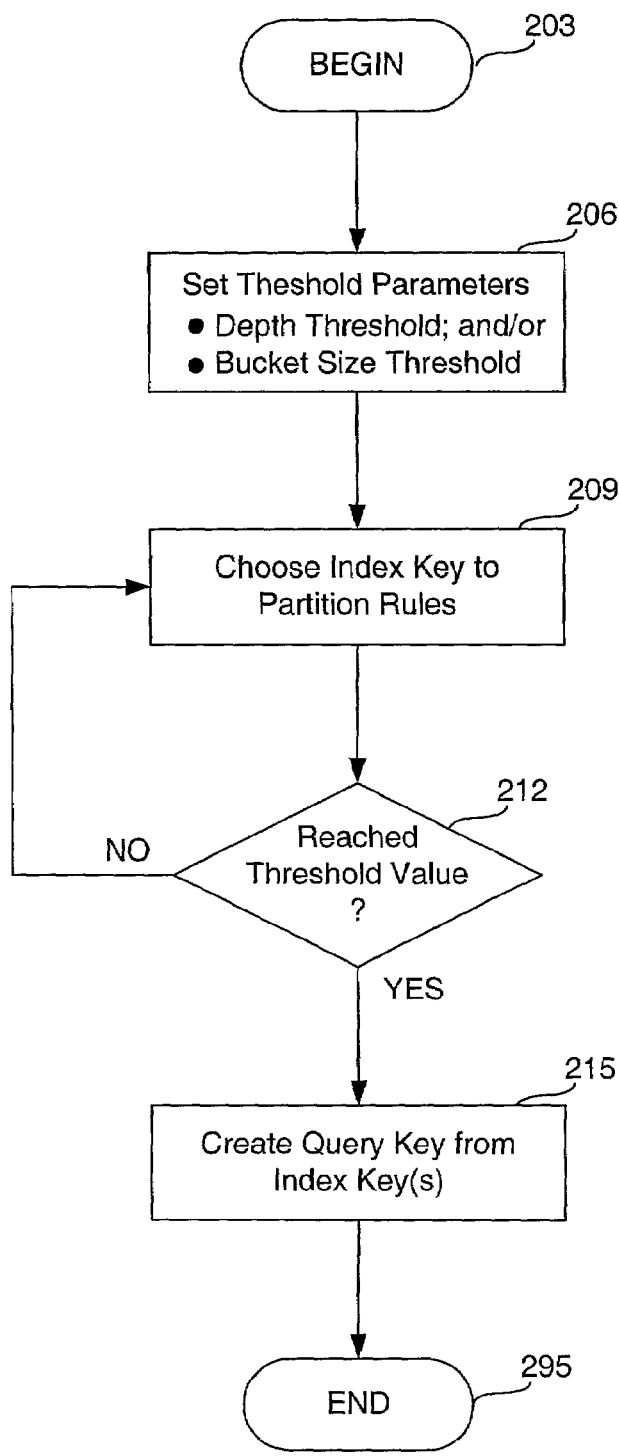
FIG. 2 illustrates an operational flow diagram for constructing an extraction function according to an embodiment of the present invention.

Referring to FIG. 2, flowchart 200 represents the general operation flow of an embodiment of the present invention. More specifically, flowchart 200 shows an example of a control flow for developing a tree-like data structure, and constructing an extraction function that utilizes the data structure. As described in greater detail below, the tree-like data structure comprises an original rule set, or root, that is subsequently partitioned into multiple subsets or nodes. Each time a node, or subset of rules, are partitioned, the data structure is deemed to have increased in depth. The node at the final depth is the leaf node, and the quantity of rules within a leaf node is referred to as the bucket size.

Referring to FIG. 2, the control flow of flowchart 200 begins at step 203 and passes immediately to step 206. At step 206, threshold parameters are established for controlling the process. In particular, the threshold parameter defines the certain aspects of the data structure and the resulting properties of the extraction function. In an embodiment, a bucket size threshold is specified to stipulate the maximum number of rules permitted in each leaf node. It is preferable to keep the bucket size small to mitigate the possibility of collisions and improve system performance. Accordingly, the bucket size can be one or more rules depending on the size of the original set of rules, memory capacity, processor speed, and various other system characteristics. The initial size of the rule set varies in each situation. If system 100 supports well known packet types, the rule set would contain a list of these types. If nothing is known about the packet types in the network or internetworking environment, system 100 could start with an empty rule set and build up as packets arrive.

In another embodiment, a depth threshold is specified to stipulate the maximum number of iterations that the rules are to be processed and/or partitioned, without regard to bucket size. The depth threshold can be a function of the size of the original set of rules, memory capacity, processor speed, and various other system characteristics. The depth threshold also determines the number of index positions to be accorded to the extraction function upon completion of its construction.

In another embodiment, both bucket size and depth threshold parameters are stipulated. In this embodiment, the rules are processed until either the stipulated depth or bucket size is reached for all nodes.

At step 209, the partitioning process is initiated to construct the extraction function. Mask constructor 106 starts with the entire set of classification rules, each of size k bits, that reside in primary rule memory 104. Mask constructor 106 analyzes each field descriptor, or bit location, until an optimal location is selected as the first location or index key in the extraction function.

At step 212, the process is repeated until the stipulated threshold is reached. At each iteration, mask constructor 106 selects a new location, such that the rule set at the previous level is divided into two siblings or subsets (one subset of rules with a zero in that chosen location, while the other subset of rules has a one in the same location) at the next level. The choice of location is based on maximizing the division of all the sets of rules from the previous level. The extent of the division of a single set is measured in terms of difference in cardinality of the siblings at the next level. In other words, the difference in cardinality is measured by computing the total of rules having a zero value at a selected location, computing the total of rules having a one value at the same location, and measuring the difference. Further, the extent of division of all sets put together at a level is captured by taking a sum of these individual differences. The smaller the sum, the greater the division. In embodiment, the sum of squares of difference in cardinality is used to measure the division. A score is computed for each location to measure the extent of division, and the location with lowest score is selected. Hence, a common bit location is selected among all siblings at each level.

At step 215, the selected locations or index keys are assembled as the extraction function. The extraction function subsequently is used as a query key to query the refined rule set for incoming packets. The control flow, then, ends as indicated at step 295.

A description of the process, in pseudo code, for selecting bits for an extraction function is shown below:

```
SelectBits(RuleSet R, NumBits l, MaxCollisions c)
{
    /* R has M rules, each of which is k bits wide */
    /* This algorithm attempts to select l bits such that the number of
    collisions is less than c */
    Ω ← {r₁, r₂,..., r_M}; /* Ω includes all rules from R */
    K ← {b₁, b₂,..., b_M}; /* K is a set of all bit locations */
    for each bit location bᵢ ∈ K do
        {
            Zbᵢ ← { rⱼ | rⱼ has a zero at bit location bᵢ };
            Obᵢ ← { rⱼ | rⱼ has a one at bit location bᵢ };
        }
    /* Note that ∀ bᵢ, Zbᵢ ∩ Obᵢ = ∅ and Zbᵢ ∪ Obᵢ = Ω */
    ℒ ← ∅ /* ℒ is set of bits that are selected so far */
    d ← 0 /* d is current depth of set division tree */
    Ω₀ ← Ω; /* Ω₀ is root of set division tree */
    divideFlag ← (|Ω₀| > c); /* divideFlag indicates whether to
    proceed with set division or not */
    while ((divideFlag) && (d < l)) do
        {
            /* Choose the next bit location */
            for each bit location bᵢ ∈ K - ℒ do
                {
                    Wbᵢ ← 0; */ Wbᵢ represents the weight of bit
                    location bᵢ in this iteration */
                    for each node Ωdⱼ at depth d do
                        Wbᵢ ← Wbᵢ + [|Ωdⱼ ∩ Zbᵢ| - |Ωdⱼ ∩
                        Obᵢ|]²
                }
            ℒ ← ℒ ∪ {b_min}; /* where Wb_min is
            minimum of all weights in this iteration */
            for each node Ωdⱼ at depth d do
                add Ωdⱼ ∩ Zbᵢ and Ωdⱼ ∩ Obᵢ as children;
            d ← d + 1; /* Extending the tree one step deeper */
            If ∀ Ωdⱼ |Ωdⱼ| < c then /* all nodes Ωdⱼ at depth d have
            less elements than c */
                divideFlag ← FALSE;
        } /* end of while */
    return ℒ; /* Return the set of selected bits */
}
```

Once optimal bit locations have been selected to build the extraction function, mask constructor 106 sends the extraction function to key extractor 110. Key extractor 110 used the extraction function to process rules and/or packets to extract bit locations. Regarding rules, the extracted locations are used to index and/or categorize the rules. Regarding packets, the extracted locations are used to develop a lookup key that is used to query or search the rules.

Figure 3:
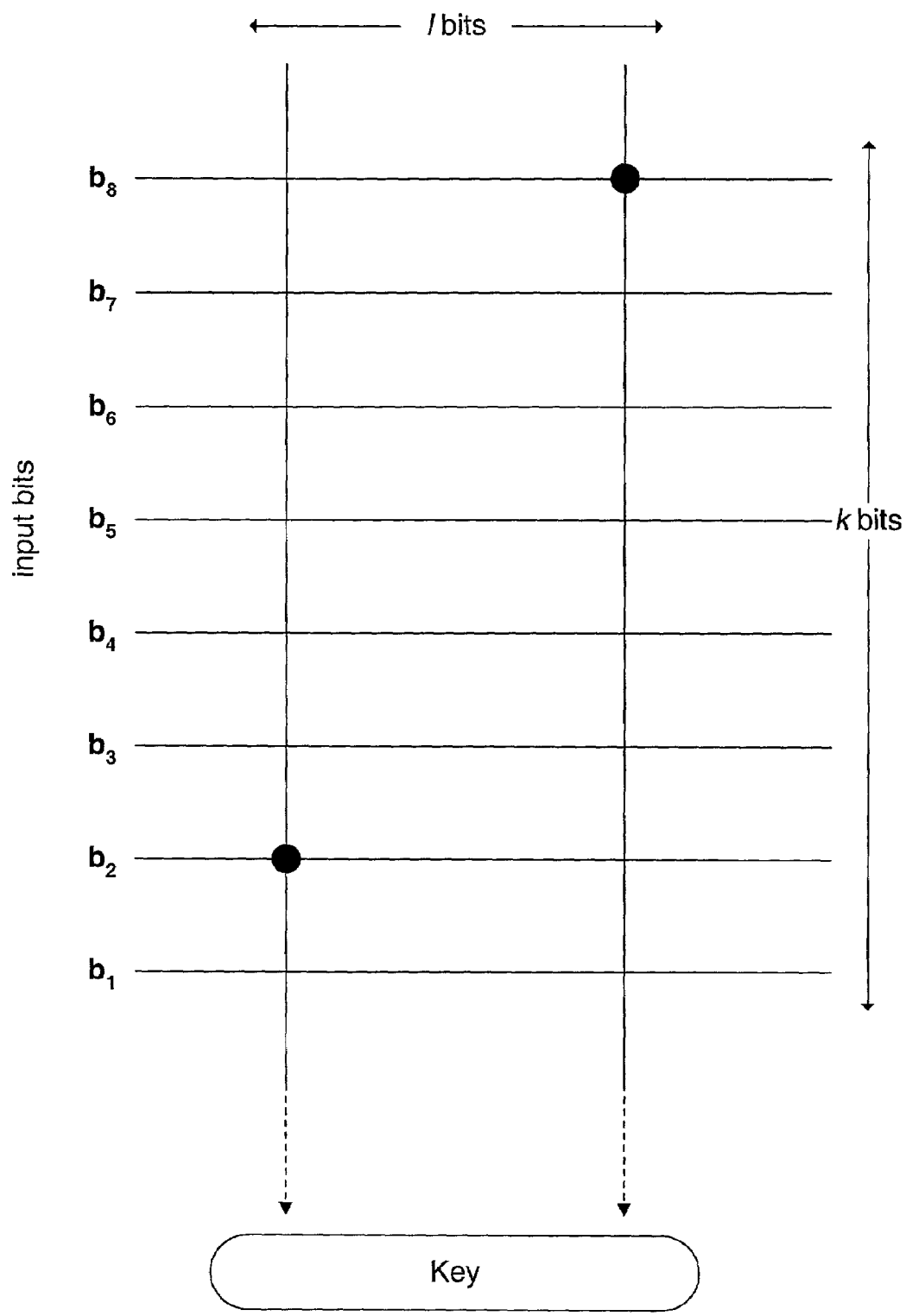
FIG. 3 illustrates a multiplexor according to another embodiment of the present invention.

Hence key extractor 110 contains a bit extraction module that is essentially a k×l multiplexor that selects the relevant l bits among the k bit header fields of, for example, a packet. FIG. 3 illustrates an exemplary implementation of the multiplexor. In an embodiment, the bit extraction is implemented in hardware as a crossbar switch with k inputs and l outputs. The l bit output is the lookup key used to query the rule set. The l bit output is directly loaded into a l bit register. The implementation of a crossbar has two elements. One is the switching matrix that requires k×l switches. For example, a 256×64 multiplexor requires 16K switches which can be implemented with current Very Large Scale Integration (VLSI) technologies.

The second element is the control logic that manages the crossbar. The crossbar needs to be reconfigured only when the bit mask changes. Therefore, the crossbar control logic does not need to reconfigure the switch matrix in a single instruction. Each of the l bit positions can be configured in a sequence. Since the reconfiguration of the switch is a low frequency event and is not in fast path, the present invention provides a crossbar implementation that is simple and real estate efficient.

If more delay can be tolerated through system 100, the multiplexor can be implemented as a bit shifter. With a bit shifter, key extractor 110 could generate the string in k+l clock cycles. This is predicated upon there being at least k shift operations and l store operations. However, the bit shifter design would limit the packet processing capability to one packet every k+l clock cycles.

In an embodiment, mask constructor 106 interacts with key extractor 110 to build an extraction function. As mask constructor chooses each location for analysis, key extractor 110 processes the rule set to identify the location value (e.g., "0" or "1"). The location value is returned to mask constructor 106 so that it can measure its cardinality, as discussed above. An example of building an extraction function is shown below with reference to Table 1 and FIG. 4.

TABLE 1

Rule Set with 8 Bit Locations

| | Bit Position | | | | | | | |
|---|---|---|---|---|---|---|---|---|
| Rule Index | 1 | 2 | 3 | 4 | 5 | 6 | 7 | 8 |
| $R_1$ | 1 | 0 | 0 | 0 | 1 | 0 | 1 | 1 |
| $R_2$ | 1 | 0 | 0 | 0 | 1 | 1 | 0 | 0 |
| $R_3$ | 0 | 1 | 1 | 0 | 1 | 1 | 0 | 1 |
| $R_4$ | 1 | 1 | 0 | 1 | 1 | 1 | 0 | 0 |

Figure 4:
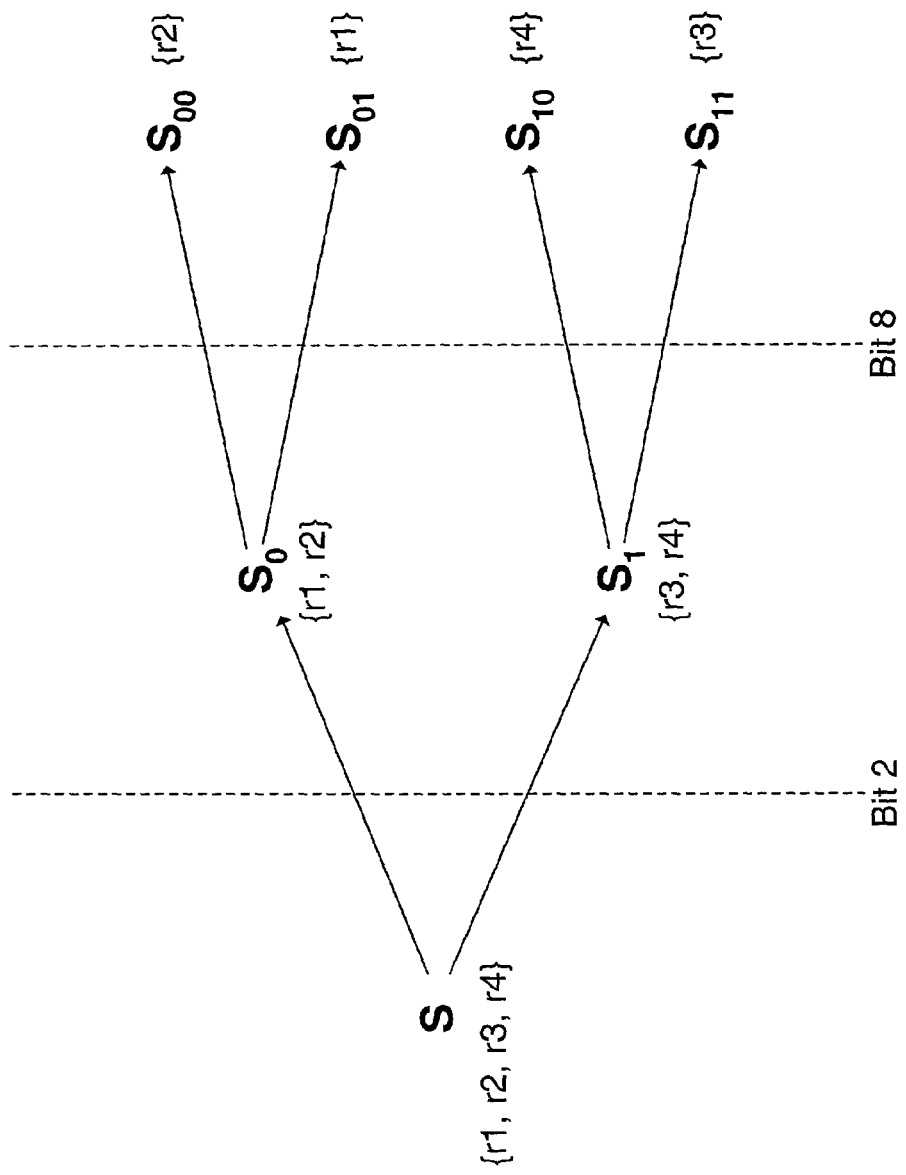
FIG. 4 illustrates a rule set division tree according to another embodiment of the present invention.

Table 1 contains a simple set of (M=4) rules that have a maximum (k=8) bits each. FIG. 4 illustrates how the rule set of Table 1 is refined by mask constructor 106 according to an embodiment of the present invention. Bit position 2 divides the set S with four rules $\{r_1, r_2, r_3, r_4\}$ into two subsets: $S_0$ and $S_1$, each with two rules. Next, bit position 8 divides these two sets $S_0$ and $S_1$ further into two subsets each. Thus, mask constructor 106 would create four subsets $S_{00}$; $S_{01}$; $S_{10}$; $S_{11}$, each of them representing one rule. Accordingly, the bit positions or bit locations 2 and 8 are representative of the entire of rules set.

Figure 5:
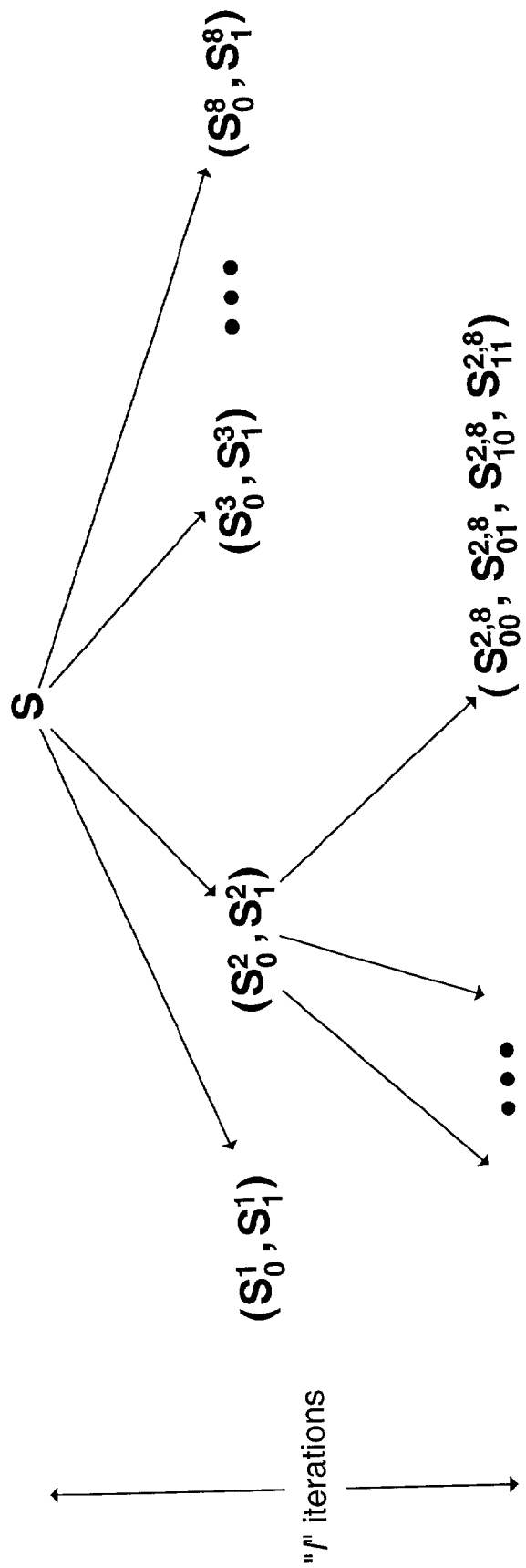
FIG. 5 illustrates a search tree according to another embodiment of the present invention.

FIG. 5 illustrates a search tree used in a greedy algorithm to select bits. At every iteration, mask constructor 106 lists all possible divisions of subsets and chooses the best one based on a weight function. The weight function maximizes the set division at a level. Referring back to Table 1, bit position 2 gives the best weight, in the first iteration, as it divides the set S exactly in half. Once a branch is chosen, mask constructor 106 continues in that direction and ignores the remaining possibilities in search tree, i.e. bit positions 1, 3, 4, 5, 6, 7 and 8. In the second iteration, the choice of bit position 8 is best because it divides the sets from bit position 2 equally. Thus, mask constructor 106 uses a greedy approach for bit selection.

Several observations can be made from the example shown in Table 1 and FIG. 5. First, the order of bit selection is not important as picking position 2 and then position 8 is the same as picking position 8 and then position 2. Second, the minimum number of bits required to identify the rules uniquely is equal to the depth of the tree at which all leaves have singleton sets. Third and last, the size of the search tree is large to be able to explore all possibilities in a real case.

The above examples have been described in reference to a binary representation of a rule set. However, the present invention can also be implemented in embodiments that use wildcards and ranges. A field descriptor or bit location having a wildcard value is capable of being any possible value. For example, if an 8-bit field (such as an IP protocol field) has a wildcard, all packets that have any of the possible values 0 to 255 match correctly on this field. As a result, each of the 8 bits corresponding to a wildcard field match either a 0 or 1. Therefore to support wildcards, the rule set follows a ternary notation (1, 0, *), in which the "*" represents both binary digits "0" and "1." Selecting an optimal bit location in such an embodiment necessitates a two-phase analysis. The metric used to measure the extent of partition is a weighted average of two parts. The first part computes the evenness of division of each set, and the second part keeps the average cardinality of children at each depth low. The first part ensures the children are almost the same size. The second part avoids bit locations with wildcards because they lead to duplication of rules.

In another embodiment, the present invention supports a field descriptor that specifies a range of values instead of just one or all of them. For example, a TCP source port descriptor can range from 100 to 200. Thus, all packets with values in this range match correctly on this field. A rule with ranges having different types needs to be preprocessed into multiple rules such that their conjunction maps onto the original rule. The decomposition of a single rule into multiple rules can be represented using wildcards in appropriate bit locations. For example, assuming a 4-bit field descriptor, a range [6,11] is decomposed into two sub ranges: [6,7] represented as 011* and [8,11] represented as 10**.

In accord with the present invention, if the length of a range is not a power of two, the rule represented by the range must be decomposed into sub ranges. Similarly if the length of a range is a power of two and the lower limit is not a power of two, the rule represented by the range must be decomposed. Otherwise, if the length of a range is a power of two and the lower limit is a power of two, the rule represented by the range does not need to be decomposed, and the rule can be processed as a wildcard, as discussed above.

An important characteristic of system 100 is the two modes of operation: full optimization and fast update. The full optimization mode updates primary rule memory 104 and refined rule memory 108 in a global sense. As such, policy engine 102 is configurable to fully reconstruct primary rule memory 104 or refined rule memory 108 in order to reduce the number of collisions. On the other hand, the fast update mode is designed to add rules directly to refined rule memory 108 in real time or near term so that the new or modified rules can be available as soon as possible.

In the fast update mode, policy engine 102 adds a new rule by using the current extraction function. The addition of rules could create collisions in the refined rule set, and hence, the extraction function stored in key extractor 110 could lose its optimality. Even though system 100 can operate effectively under less optimal conditions, mask constructor 106 is configurable to reconstruct the extraction function at a periodically scheduled rate, or on demand, to preserve a desired level of optimality. For example, the extraction function can be modified to keep collisions within a predetermined range or below a preset threshold. As such, the tradeoff between optimality and processing requirements is controlled by the frequency of reconstructing the extraction function. Additionally, system 100 provides a dynamically changing extraction function and a set of updating policies that allow adjusting the processing and memory requirements of a current data set to available hardware resources of system 100.

The bit selection implemented by mask constructor 106 to create a hash function or bit mask can be run offline on a separate processor or multiprocessor. The frequency of executing bit selection can affect the optimality of the refined rule set. Therefore it is imperative to choose good values for request queue threshold and time-out period that control the frequency of optimization. Policy engine 102 that dictates the rule addition or deletion actions can also be run on an offline processor.

Figure 6:
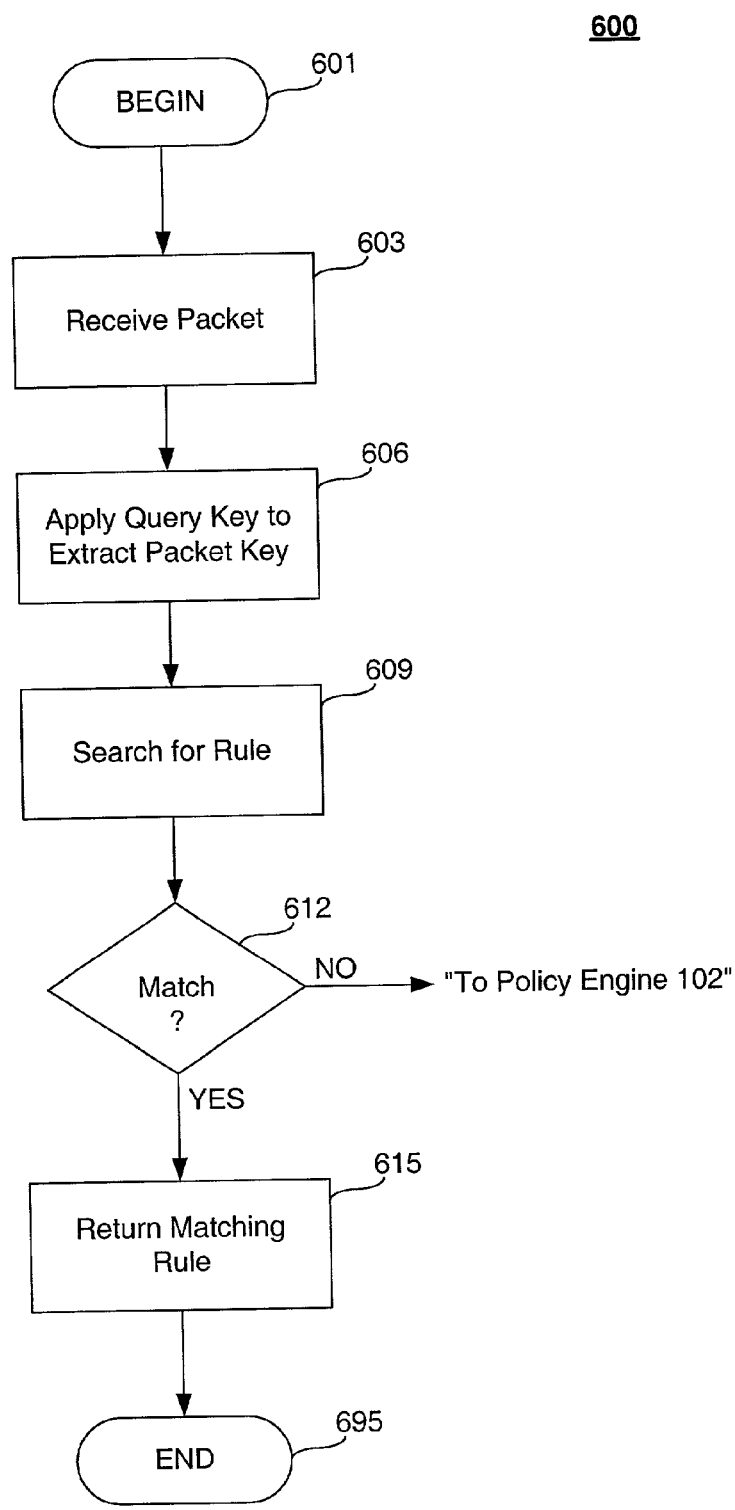
FIG. 6 illustrates an operational flow diagram for classifying a packet according to an embodiment of the present invention.

Upon constructing an extraction function, the extraction function is used to classify packets in a dynamic system. Referring to FIG. 6, flowchart 600 represents the general operational flow of an embodiment of the present invention. More specifically, flowchart 600 shows an example of a control flow for dynamically classifying a packet.

Referring to FIG. 6, the control flow of flowchart 600 begins at step 601 and passes immediately to step 603. At step 603, a packet arrives at key extractor 110. At step 606, an extraction function (e.g., hash function (H)) or query key is applied to the packet to obtain a packet key.

Figure 7:
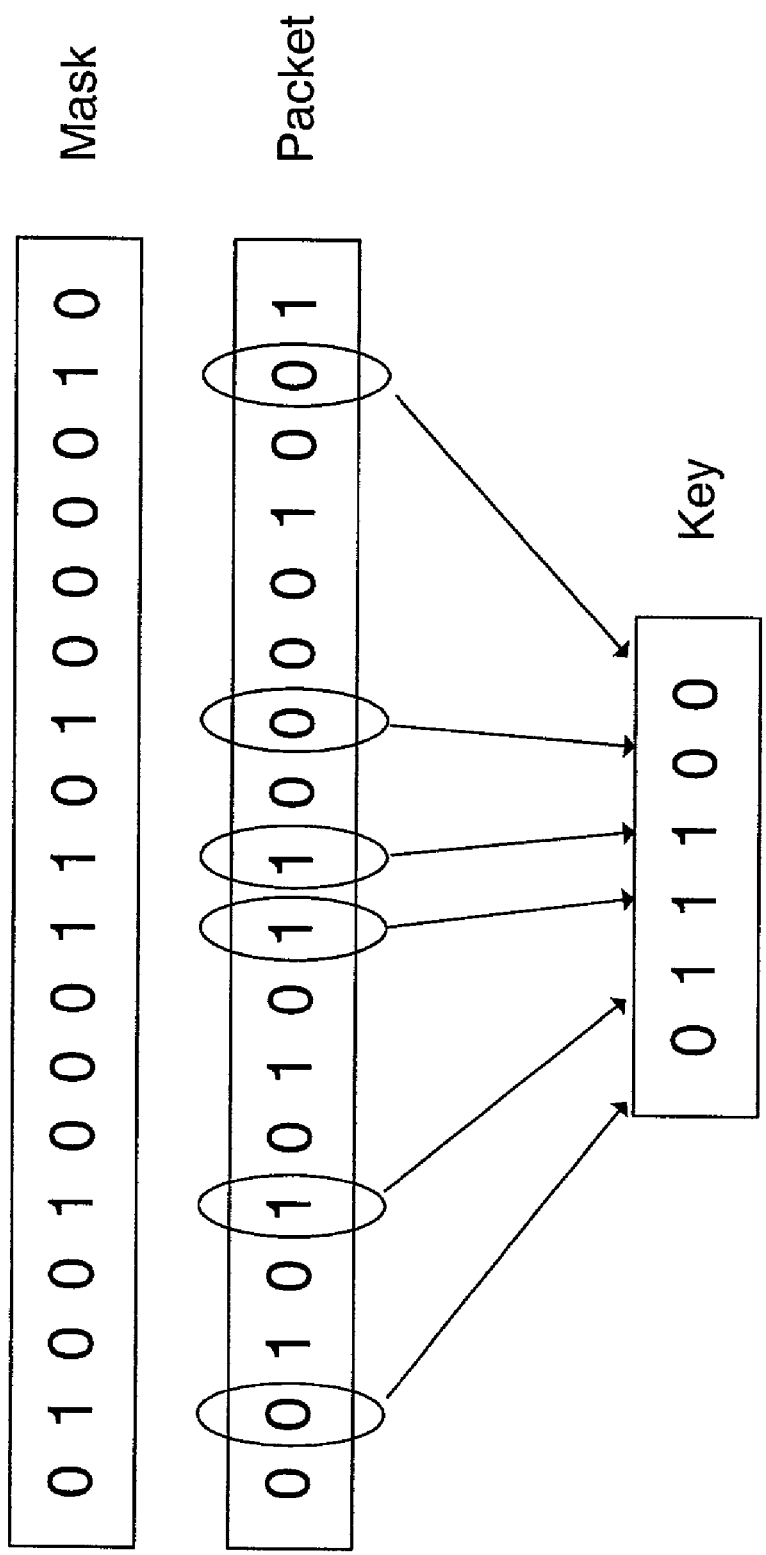
FIG. 7 illustrates a bit extraction key according to another embodiment of the present invention.

As discussed, mask constructor 106, in an embodiment, produces a hash function H as a bit mask (of size k bits) that is used to extract bits from an incoming packet. FIG. 7 illustrates the bit extraction operation. At every selected bit location $p_i$, the bit mask has a 1 and 0 everywhere else. Key extractor 110 applies the bit mask onto an incoming packet (essentially, a string of k bits) to extract bits at selected locations and concatenate them to form a l-bit wide key. The effectiveness of the hash function depends on how representative are the chosen l bit locations. This, in turn, depends on the rule set used in classification.

Referring back to FIG. 6, at step 609, packet classifier 112 uses the packet key to identify a rule that matches the incoming packet. Packet classifier 112, in an embodiment, uses a lookup algorithm to match the packet key l bit string against the refined rule set located in refined rule memory 108. In an embodiment, the fixed length string comparisons are implemented in hardware using a Content Addressable Memory (CAM) that allows fast and parallel comparisons. Hence, in this embodiment, refined primary memory 108 is a binary CAM. Each entry (word) in the CAM has an l bit vector and match identifier (of x bits wide) of the bucket containing its corresponding rule. The CAM is M words long and l+x bits wide. The packet key obtained from the bit extraction is used in the CAM lookup.

If, at step 612, no matching rule is found, policy engine 102 is queried for disposition instructions. For example, if a new type of packet is first presented to packet classifier 112, the packet is classified according to a default rule that executes a default action. In an embodiment, packet classifier 112 obtains the default rule by querying refined rule memory 108. Refined rule memory 108 interacts with policy engine 102 to create a new rule so that subsequent packets of this type can be handled accordingly.

On the other hand, if at step 612, a matching rule is found, the control flow passes to step 615. Using the matching rule, packet classifier 112 queries policy engine 102 or refined rule memory 108 to select an action to be performed on the packet. The action outcome is obtained from a table that contains all classification rules. The table can be located in refined rule memory 108 or policy engine 102. The rule table is built and updated by policy engine 102. The table is updated when the rules set changes, which is typically less frequently than the packet arrival rate. Since the execution of the action is independent of classification, the control flow ends as indicated at step 695.

Flowchart 600 is premised on receiving one matching rule at step 615. The lookup is a one-cycle operation and the result is a success or failure with the appropriate match identifier. For buckets of size 1, CAM lookup returns the match identifier associated with the rule. On the other hand, if the buckets are of a size greater than 1, the match identifier returns an identifier of the bucket because collision has occurred. Therefore, additional processing is required to further classify an incoming packet if buckets have more than one rule in them.

Figure 8:
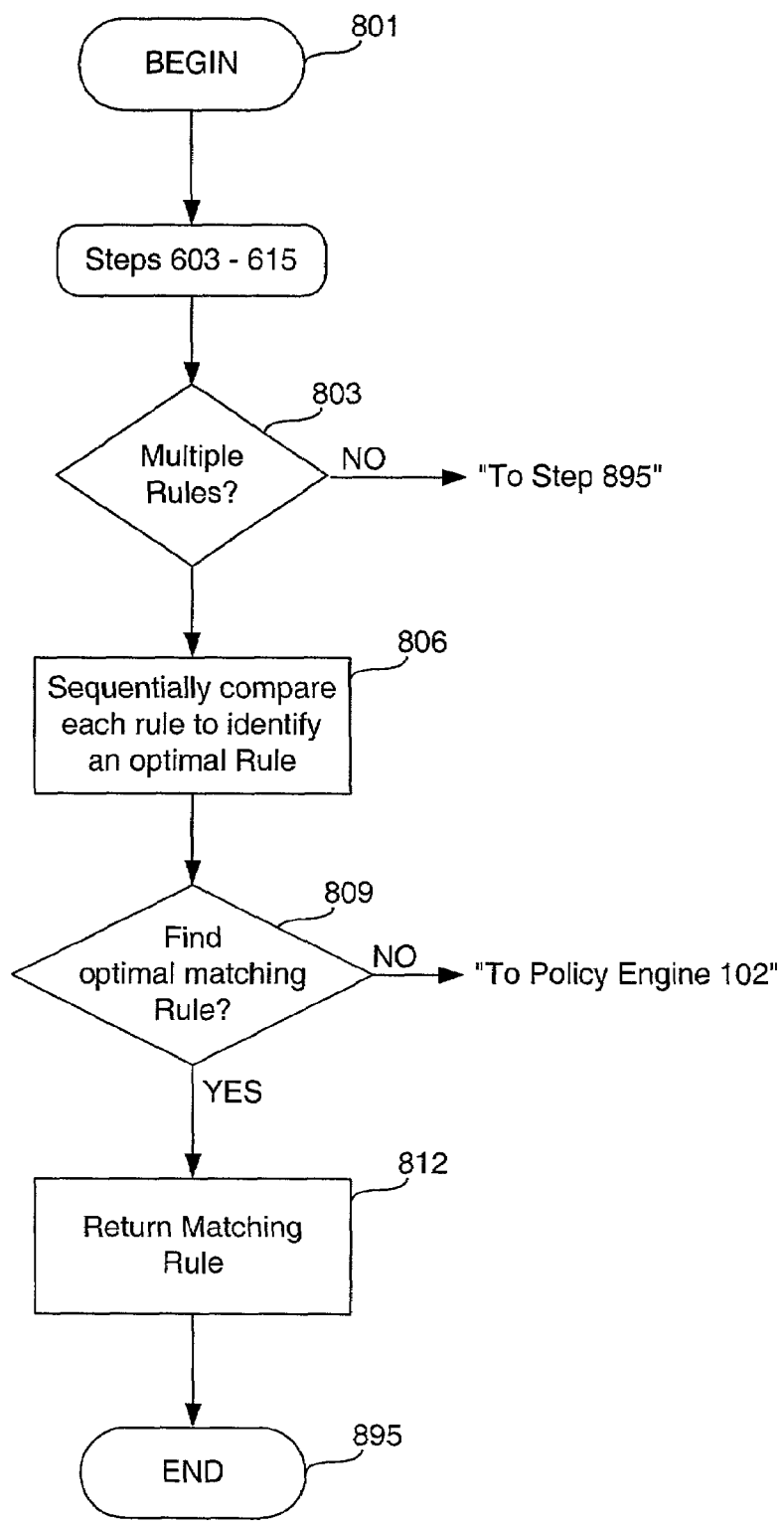
FIG. 8 illustrates an operational flow diagram for classifying a packet according to another embodiment of the present invention.

Referring to FIG. 8, flowchart 800 represents the general operational flow of another embodiment of the present invention. More specifically, flowchart 800 shows an example of a control flow for classifying a packet if collision should occur.

Referring to FIG. 8, the control flow of flowchart 800 begins at step 801 and passes immediately to steps 603–615, as discussed above. At step 803, packet classifier 112 identifies a set of rules instead of a single rule. In this case, at step 806, packet classifier 112 implements a verification process to narrow the rule set by determining which rule within the rule set is the one that matches the particular packet. Packet classifier 112 uses the match identifier obtained from step 609 to locate the candidate rules that could potentially match the packet in consideration. The candidate rules accessed from refined rule memory 108 are compared with k bits in the packet either in sequence or in parallel. Sequential comparison could be made with a one k bit wide comparator. The candidate rules are searched in sequence, and hence would take as many as bucket size b cycles. Also, in cases where b can be bound to a small value, a group of b such comparators can be provided for faster comparison. On the other hand, the candidate rules could be stored in another CAM prefixed with the match identifier of the bucket. However, this would require a CAM with a large width to store an entire rule along with the bucket identifier as a prefix. Though this option is good in terms of clock cycles, it may not be cost effective.

At step 809, if no matching rule is found, policy engine 102 is queried for disposition instructions. On the other hand, if at step 809, a matching rule is found, the control flow passes to step 812. Using the matching rule, packet classifier 112 queries policy engine 102 or refined rule memory 108 to select an action to be performed on the packet. The control flow then ends as indicated at step 895.

FIGS. 1–8 provide a conceptual illustration of system 100 that allows an easy explanation of the present invention. That is, one or more of the blocks can be performed by the same piece of hardware or module of software. It should also be understood that embodiments of the present invention can be implemented in hardware, software, or a combination thereof. In such an embodiment, the various components and steps would be implemented in hardware and/or software to perform the functions of the present invention.

Various software embodiments are described in terms of the present invention. After reading this description, it will become apparent to a person skilled in the relevant art(s) how to implement the invention using other computer systems and/or computer architectures.

In this document, the terms "computer program medium" and "computer usable medium" are used to generally refer to media such as a removable storage drive, a hard disk installed in hard disk drive, and signals (e.g., electronic, electromagnetic, optical, or the like). A removable storage drive refers to a floppy disk drive, a magnetic tape drive, an optical disk drive, and the like. These computer program products are means for providing software to components of system 100, such as mask constructor 106, packet classifier 112, key extractor 110, and others. The present invention is directed to such computer program products.

Computer programs (also called computer control logic) are stored in a main memory and/or secondary memory, such as primary rule memory 104, refined rule memory 108, and policy engine 102. Computer programs can also be received via a communications interface with system 100. Such computer programs, when executed, enable system 100 to perform the features of the present invention as discussed herein. Accordingly, such computer programs represent controllers of system 100.

In an embodiment where the invention is implemented using software, the software can be stored in a computer program product and loaded into system 100 using a removable storage drive, hard drive or communications interface with system 100. The control logic (software), when executed by a processor (e.g. mask constructor 106, packet classifier 112, or key extractor 110), causes the processor to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Thus, the present invention should not be limited by any of the above-described exemplary embodiments, but should be defined only in accordance with the following claims and their equivalents.

What is claimed is:

1. A computer-implemented method for creating and/or modifying a dynamically update-able, searchable packet classification databank, comprising the steps of:

receiving a collection of packet classification rules, each packet classification rule being represented as a plurality of bit positions;

analyzing each of said plurality of bit positions to select a first bit position to partition said collection into at least two sets of siblings, wherein said analyzing includes applying at least one of empirical knowledge or a computed metric for each bit position to select said first bit position;

selecting an index key corresponding to said first bit position;

analyzing said plurality of bit positions to select a second bit position to partition said at least two sets of siblings into subsets of siblings; and selecting an index key corresponding to said second bit position.

2. The method of claim 1, further comprising the step of:

selecting an index key corresponding to a third bit position to partition said subsets of siblings into further subsets.

3. The method of claim 1, further comprising the step of:

repetitively partitioning said subsets of siblings into a hierarchy of subsets at a lower level until reaching a partition threshold.

4. The method of claim 3, wherein said partition threshold is predicated on a maximum number of rules residing in a subset of siblings at a respective lower level.

5. The method of claim 3, wherein said partition threshold is predicated on a maximum number of respective lower levels.

6. The method of claim 1, wherein each sibling at a respective level has a substantially equivalent quantity of said packet classification rules.

7. The method of claim 1, wherein each of said analyzing steps include the steps of:
measuring a difference in cardinality at each bit position that has not been selected previously for a corresponding index key; and
computing an optimization parameter for each bit position.

8. The method of claim 7, wherein each of said analyzing steps further include the step of:
selecting an index key corresponding to a bit position having an optimization parameter closest to a predetermined value.

9. The method of claim 7, wherein each of said analyzing steps further include the step of:
selecting an index key corresponding to a first bit position determined to have an optimization parameter closest to a predetermined value in response to determining multiple bit positions having an optimization parameter closest to a predetermined value.

10. The method of claim 1, further comprising the step of:
receiving at least one packet classification rule within said collection that has one or more bit positions denoted as having a plurality of values.

11. The method of claim 10, wherein each of said analyzing steps further include the steps of:
measuring a difference in cardinality at each bit position that has not been selected previously for a corresponding index key; and
computing an optimization parameter for each bit position.

12. The method of claim 11, wherein said computing an optimization parameter comprises:
determining an evenness of division for siblings at a respective level; and
determining an average cardinality.

13. The method of claim 1, further comprising the steps of:
receiving at least one packet classification rule within said collection that has two or more bit positions that denote a feature having a range of values; and
decomposing said at least one packet classification rule into two or more packet classification divisional rules, wherein said analyzing steps further include processing said divisional rules as part of said collection.

14. The method of claim 1, further comprising the step of:
manifesting a query key based on the selected index keys.

15. The method of claim 14, further comprising the steps of:
enabling addition and/or deletion of a packet classification rule in said collection; and
revising said query key in response to said addition and/or deletion of a packet classification rule.

16. The method of claim 15, further comprising the step of:
performing said revising said query key on a periodically scheduled basis.

17. The method of claim 15, further comprising the step of:
performing said revising said query key on demand.

18. The method of claim 14, further comprising the steps of:
receiving a packet;
applying said query key to said packet to produce a packet key; and
searching said collection to detect a packet classification rule matching said packet key.

19. The method of claim 18, further comprising the steps of:
detecting multiple packet classification rules matching said packet key; and
selecting a collision location key corresponding to a bit position to enable partitioning of said multiple packet classification rules.

20. The method of claim 18, further comprising the steps of:
detecting multiple packet classification rules matching said packet key; and
sequentially comparing each of said multiple packet classification rules with said packet to detect a matching rule.

21. The method of claim 18, further comprising the step of:
enabling addition and/or deletion of a packet classification rule in said collection during said searching said collection.

22. A packet classification system, comprising:
a first memory for receiving a collection of packet classification rules, wherein each packet classification rule is represented as a plurality of bit positions; and
a mask constructor for selecting one or more index keys, wherein each index key corresponds to a bit position that enables partitioning of said packet classification rules into at least two sets of siblings at a lower level,
wherein said mask constructor applies at least one of empirical knowledge or a computed metric for each bit position to select the bit position corresponding to each index key, and
wherein said mask constructor continues to select index keys to repetitively partition each set of siblings at a respective level into at least two sets of siblings at a lower level until reaching a partition threshold.

23. The system of claim 22, wherein said mask constructor assembles said one or more index keys into a query key.

24. The system of claim 23, further comprising:
a key extractor for applying said query key to produce a refined rule collection from said collection located within said first memory; and
a second memory for storing said refined rule collection.

25. The system of claim 24, wherein said second memory is a content addressable memory.

26. The system of claim 23, further comprising:
a key extractor for applying said query key to an incoming packet to produce a packet key.

27. The system of claim 26, further comprising:
a packet classifier for applying said packet key to detect a packet classification rule matching said packet key.

28. The system of claim 26, wherein said key extractor is a multiplexor, wherein said multiplexor is configured to select field descriptors from said packet based on said query key.

29. The system of claim 28, wherein said multiplexor is a crossbar switch or a bit shifter.

30. A computer program product comprising a computer useable medium having computer readable program code means embedded in said medium for causing a computer to classify packet flows, comprising:
a first computer readable program code means for causing the computer to select one or more index keys, wherein said first computer readable program code means selects each index key such that each index key corresponds to a bit position that enables partitioning of a set of packet classification rules into two or more sets of siblings at a lower level, wherein said first computer readable program code means applies at least one of empirical knowledge or a computed metric for each location to select the bit position corresponding to each index key, and wherein said first computer readable program code means continues to select index keys to repetitively partition each set of siblings at a respective level into at least two sets of siblings at a lower level until reaching a partition threshold; and a second computer readable program code means for causing the computer to assemble said one or more index keys into a query key.

31. A computer-implemented method for creating and/or modifying a dynamically update-able, searchable packet classification databank, comprising the steps of:

receiving a collection of packet classification rules, each packet classification rule being represented as a plurality of location coordinates;

selecting an index key based on a common location coordinate among the packet classification rules at a first level to enable partitioning of said collection into two or more siblings at a second level, wherein the coordinate value of said common location coordinate represents a feature whereby the composition of each sibling contains packet classification rules possessing a common feature; and selecting an index key based on a second common location coordinate among said packet classification rules at said second level to enable partitioning of at least one of said two or more siblings at said second level into two or more siblings at a third level, wherein each of said selecting an index key step comprises the steps of:

measuring a difference in cardinality at each location coordinate that has not been selected previously as an index key; and computing an optimization parameter for each location coordinate.

32. The method of claim 31, wherein each of said selecting an index key step further comprises the step of:

selecting an index key corresponding to a location coordinate having an optimization parameter closest to a predetermined value.

33. The method of claim 31, wherein each of said selecting an index key step further comprises the step of:

selecting an index key corresponding to a first location coordinate determined to have an optimization parameter closest to a predetermined value in response to determining multiple location coordinates having an optimization parameter closest to a predetermined value.

34. A computer-implemented method for creating and/or modifying a dynamically update-able, searchable packet classification databank, comprising the steps of:

receiving a collection of packet classification rules, each packet classification rule being represented as a plurality of location coordinates;

receiving at least one packet classification rule within said collection that has one or more location coordinates denoted as having a plurality of values;

selecting an index key based on a common location coordinate among said packet classification rules at a first level to enable partitioning of said collection into two or more siblings at a second level, wherein the coordinate value of said common location coordinate represents a feature whereby the composition of each sibling contains packet classification rules possessing a common feature; and selecting an index key based on a second common location among said packet classification rules at said second level to enable partitioning of at least one of said two or more siblings at said second level into two or more siblings at a third level, wherein each of said selecting an index key step comprises the steps of:

measuring a difference in cardinality at each location coordinate that has not been selected previously as an index key; and computing an optimization parameter for each location coordinate.

35. The method of claim 34, wherein said computing an optimization parameter comprises:

determining an evenness of division for siblings at a respective level; and determining an average cardinality.

* * * * *